(12) United States Patent
Yu (10) Patent No.: US 11,684,075 B2
(45) Date of Patent: Jun. 27, 2023

(54) DEVICE AND SYSTEM FOR GENERATING LOW FREQUENCY ALTERNATING ELECTRIC FIELD, AND SIGNAL CONDITIONING METHOD

(71) Applicant: ZHEJIANG CHILLY TECHNOLOGY CORP. LTD., Zhejiang (CN)

(72) Inventor: Ming Yu, Yangjiang (CN)

(73) Assignee: Zhejiang Chilly Technology Corp. Ltd., Zhoushan (CN)

( * ) Notice: Subject to any disclaimer, the term of this patent is extended or adjusted under 35 U.S.C. 154(b) by 959 days.

(21) Appl. No.: 16/309,103

(22) PCT Filed: Jan. 31, 2018

(86) PCT No.: PCT/CN2018/074823
§ 371 (c)(1),
(2) Date: Dec. 11, 2018

(87) PCT Pub. No.: WO2018/161745
PCT Pub. Date: Sep. 13, 2018

(65) Prior Publication Data
US 2019/0380363 A1    Dec. 19, 2019

(30) Foreign Application Priority Data

Mar. 8, 2017   (CN) .......................... 201710135409.8

(51) Int. Cl.
*A23L 3/32*   (2006.01)
*A23L 3/00*   (2006.01)
*H01F 38/14*  (2006.01)

(52) U.S. Cl.
CPC .................. *A23L 3/32* (2013.01); *A23L 3/003* (2013.01); *A23V 2002/00* (2013.01); *H01F 38/14* (2013.01)

(58) Field of Classification Search
None
See application file for complete search history.

(56) References Cited

U.S. PATENT DOCUMENTS 6,138,555 A * 10/2000 Hata .......................... A23L 3/32
363/52
6,451,364 B1 * 9/2002 Ito .............................. A23L 3/36
426/244

(Continued)

FOREIGN PATENT DOCUMENTS

CN    103219897    7/2013
CN    103904559    7/2014

(Continued)

OTHER PUBLICATIONS

International Search Report and Written Opinion dated Apr. 17, 2018, in related International Patent Application PCT/US2018/074823, as well as partial translation thereof (English translation of ISR); 12 pages total.

(Continued)

*Primary Examiner* — Cassandra F Cox
(74) *Attorney, Agent, or Firm* — Greenberg Traurig, LLP (57) ABSTRACT

A device for generating alternating electric field of low frequency, a system for generating alternating electric field of low frequency, and a signal regulating method are provided. According to implementations herein, a device for generating alternating electric field of low frequency may comprise an input control module, a transformer, an output control module, and an electric discharge module. In one aspect, an input end of the input control module is configured to be coupled with an external AC power supply, the input control module is coupled with a primary side winding of the transformer, one end of a secondary side winding of the transformer is coupled with the output control module, the output control module is coupled with the electric discharge module, and the other end of the secondary side winding of the transformer is coupled with ground potential.

20 Claims, 4 Drawing Sheets

(56) References Cited

U.S. PATENT DOCUMENTS

| | | | |
|---|---|---|---|
| 9,681,677 B2 | 6/2017 | Goto et al. | |
| 2006/0130674 A1* | 6/2006 | Uchikawa | A47J 37/1261 99/451 |
| 2008/0037290 A1 | 2/2008 | Suzuki et al. | |
| 2009/0044544 A1* | 2/2009 | Kim | F25D 29/00 62/3.1 |
| 2016/0015076 A1 | 1/2016 | Goto et al. | |
| 2017/0258117 A1 | 9/2017 | Goto et al. | |
| 2017/0311636 A1 | 11/2017 | Goto et al. | |

FOREIGN PATENT DOCUMENTS

| | | |
|---|---|---|
| CN | 104486898 | 4/2015 |
| CN | 106712532 | 5/2017 |
| CN | 106856374 | 6/2017 |
| CN | 206498333 | 9/2017 |
| CN | 206533289 | 9/2017 |
| EP | 2543254 | 1/2013 |
| KR | 20080003133 | 1/2008 |
| WO | 2009044544 | 4/2009 |
| WO | 2009126084 | 10/2009 |

OTHER PUBLICATIONS

International Search Report from PCT application No. PCT/CN2018/074823, dated Apr. 17, 2018, 5 pgs.

Examination Report from Australian Application No. 2018229897, dated May 31, 2019, 2 pgs.

Office Action from European Application No. 18763255.9, dated Apr. 17, 2020, 4 pgs.

Second Office Action from European Application No. 18763255.9, dated Oct. 6, 2021, 7 pgs.

* cited by examiner

DEVICE AND SYSTEM FOR GENERATING LOW FREQUENCY ALTERNATING ELECTRIC FIELD, AND SIGNAL CONDITIONING METHOD

CROSS-REFERENCE TO RELATED APPLICATIONS

This application is a 371 U.S. National Phase of international application No. PCT/CN2018/074823, filed Jan. 31, 2018, published as WO2018/161745A1, claiming benefit/priority of Chinese patent application number 201710135409.8, filed Mar. 8, 2017, published as CN106856374A, all of which are incorporated herein by reference in entirety.

TECHNICAL FIELD

The present disclosure relates to the field of biomass preservation equipment, particularly to a device for generating alternating electric field of low frequency, a system for generating alternating electric field of low frequency, and a signal regulating method.

BACKGROUND ART

With the development and improvement of science and technology, the electric power technology is applied to the field of biomass preservation. When energized by static electricity or placed in an electrostatic field, a better preservation effect can be given to food or agricultural products.

In the prior art, it is feasible to contain biomass in a container made of an electrically conductive material and place the container on a metal bench energized by an electrostatic power supply, in order to acquire preservation effect. However, since this technology requires the use of a high voltage, the preservation bench and the storage and preservation facilities both need excellent insulating properties so as to ensure use safety, resulting in extremely high production cost and use and maintenance costs with the technology. Besides, it is also feasible to form a high voltage electrostatic field between positive and negative discharge electrode plates in order to achieve a function of keeping the biomass placed therebetween fresh. However, this technology also faces the cost and safety problems of the insulation facilities under high voltage operation conditions. Moreover, under a high voltage, cell membranes of the preserved raw material tissues are likely to be broken down by the high voltage, and then when the preservation treatment is released, deterioration will be accelerated.

Therefore, how to effectively reduce the production cost and use and maintenance costs of the equipment while effectively improving the preservation effect is a major problem in the industry at present.

SUMMARY

In view of this, an object of the present disclosure is to provide a device for generating alternating electric field of low frequency, a system for generating alternating electric field of low frequency, and a signal regulating method, so as to overcome the above defects.

Embodiments of the present disclosure are implemented as follows:

In a first aspect, an embodiment of the present disclosure provides a device for generating alternating electric field of low frequency. The device for generating alternating electric field of low frequency comprises: an input control module, a transformer, an output control module and an electric discharge module; wherein an input end of the input control module is configured to be coupled with an external AC power supply, the input control module is coupled with a primary side winding of the transformer, one end of a secondary side winding of the transformer is coupled with the output control module, the output control module is coupled with the electric discharge module, and the other end of the secondary side winding of the transformer is coupled with ground potential. The input control module is configured to acquire an alternating signal input from the external AC power supply, generate a first low frequency signal according to the alternating signal and the type of preserved biomass, and output the first low frequency signal to the primary side winding of the transformer. The output control module is configured to acquire a second low frequency signal output from the secondary side winding of the transformer, and adjust a current value of the second low frequency signal according to the type of the preserved biomass and the alternating signal so as to output the adjusted second low frequency signal to the electric discharge module. The electric discharge module is configured to generate an alternating electric field of low frequency according to the received second low frequency signal.

Further, the input control module comprises a rectification unit and an invert unit. The rectification unit is configured to be coupled with the external AC power supply, the rectification unit is further coupled with an input end of the invert unit, and the invert unit is coupled with the primary side winding of the transformer. The rectification unit is configured to rectify an alternating signal input from the external AC power supply and then output the alternating signal to the invert unit. The invert unit is configured to acquire the alternating signal output from the rectification unit, and output the first low frequency signal, generated according to the type of the preserved biomass, to the primary side winding of the transformer, wherein the first low frequency signal includes a sine wave, a cosine wave, a square wave, a rectangular wave, a trapezoidal wave or a sawtooth wave.

Further, the device for generating alternating electric field of low frequency further comprises a protection module which is coupled with the other end of the secondary side winding of the transformer and the ground potential.

Further, the alternating electric field of low frequency has a voltage intensity ranging from 500 volts to 5000 volts on an electrode of the electric discharge module.

Further, the electric discharge module is made of an electrically conductive material, wherein the electric discharge module is in shape of a plate, a strip, a column or a net.

Further, an outer surface of the electric discharge module is covered by an insulation material.

Further, the second low frequency signal has a current intensity ranging from 0.0001 amps to 0.15 amps.

In a second aspect, an embodiment of the present disclosure provides a signal regulating method, applicable to the device for generating alternating electric field of low frequency. The device for generating alternating electric field of low frequency comprises: an input control module, a transformer, an output control module and an electric discharge module; wherein an input end of the input control module is configured to be coupled with an external AC power supply, the input control module is coupled with a primary side winding of the transformer, one end of a secondary side winding of the transformer is coupled with the output control module, the output control module is coupled with the electric discharge module, and the other end of the secondary side winding of the transformer is coupled with ground potential. The method comprises: the input control module acquiring an alternating signal input from the external AC power supply, generating a first low frequency signal according to the alternating signal and the type of preserved biomass, and outputting the first low frequency signal to the primary side winding of the transformer; the output control module acquiring a second low frequency signal output from the secondary side winding of the transformer, and adjusting a current value of the second low frequency signal according to the type of the preserved biomass so as to output the adjusted second low frequency signal to the electric discharge module; and the electric discharge module generating an alternating electric field of low frequency according to the received second low frequency signal.

Further, the input control module comprises: a rectification unit and an invert unit. The rectification unit is configured to be coupled with the external AC power supply, the rectification unit is further coupled with an input end of the invert unit, and the invert unit is coupled with the primary side winding of the transformer. The method further comprises: the rectification unit being configured to rectify an alternating signal input from the external AC power supply and then output the alternating signal to the invert unit; and the invert unit being configured to acquire the alternating signal output from the rectification unit, and output the first low frequency signal, generated according to the type of the preserved biomass and the alternating signal, to the primary side winding of the transformer, wherein the first low frequency signal includes a sine wave, a cosine wave, a square wave, a rectangular wave, a trapezoidal wave or a sawtooth wave.

In a third aspect, an embodiment of the present disclosure provides a system for generating alternating electric field of low frequency. The system for generating alternating electric field of low frequency comprises: a controller and the device for generating alternating electric field of low frequency, wherein the controller is coupled with the device for generating alternating electric field of low frequency.

The advantageous effects of the embodiments of the present disclosure are as follows:

With the input control module, it is possible to acquire an alternating signal input from an external AC power supply, and generate, according to the acquired alternating signal and the type of the preserved biomass a first low frequency signal corresponding to the type of preserved biomass, and output the first low frequency signal to a primary side winding of the transformer. The transformer outputs a second low frequency signal from a secondary side winding according to the first low frequency signal of the primary side winding by means of the electromagnetic coupling relation between the primary side winding and the secondary side winding of the transformer. The output control module can acquire the second low frequency signal output from the secondary side winding of the transformer, and adjust the current value of the second low frequency signal according to the type of the preserved biomass so as to output the adjusted second low frequency signal which corresponds to the type of the preserved biomass to the electric discharge module. The electric discharge module can discharge electricity to generate an alternating electric field of low frequency by the received second low frequency signal. When the preserved biomass is placed in the alternating electric field of low frequency, the alternating electric field of low frequency can cause the water molecules in the preserved biomass to swing at the same frequency, thereby effectively suppressing the biochemical reactions and physiological metabolism in the preserved biomass, therefore making it possible to achieve an excellent preservation function on the preserved biomass. In addition, since the characteristics of the alternating electric field of low frequency can correspond to the type of the biomass to be preserved, the alternating electric field of low frequency can exert excellent preservation effect on the preserved biomass.

Other features and advantages of the present disclosure will be illustrated in following description, and will partially be apparent from the description, or understood by implementing the embodiments of the present disclosure. The objects and other advantages of the present disclosure may be achieved and obtained through the structures specifically indicated in the description, the claims, and the accompanying drawings.

BRIEF DESCRIPTION OF DRAWINGS

In order to more clearly illustrate technical solutions in embodiments of the present disclosure or in the prior art, accompanying drawings which are needed for description of the embodiments will be introduced briefly below. Apparently, the accompanying drawings in the description below are merely for some embodiments of the present disclosure. A person ordinarily skilled in the art still can obtain other relevant drawings in light of these accompanying drawings, without paying inventive effort. From the accompanying drawings, the above and other objects, features, and advantages of the present disclosure will become clearer. The same reference signs refer to the same parts throughout the accompanying drawings. The accompanying drawings are not intentionally scaled or drawn according to an actual size, with the emphasis of showing the gist of the present disclosure.

Reference signs: 200—system for generating alternating electric field of low frequency; 210—controller; 100—device for generating alternating electric field of low frequency; 110—input control module; 111—rectification unit;

112—invert unit; 120—protection module; 130—output control module; and 140—electric discharge module.

DETAILED DESCRIPTION OF EMBODIMENTS

In order to make the objects, technical solutions, and advantages of the embodiments of the present disclosure clearer, the technical solutions in the embodiments of the present disclosure will be described clearly and completely below in conjunction with the accompanying drawings in the embodiments of the present disclosure, apparently, some but not all embodiments of the present disclosure are described. Generally, components in the embodiments of the present disclosure, described and shown in the accompanying drawings herein, may be arranged and designed in different configurations.

Therefore, the following detailed description of the embodiments of the present disclosure provided in the accompanying drawings is not intended to limit the scope of protection of the present disclosure, but merely represents chosen embodiments of the present disclosure. On the basis of the embodiments of the present disclosure, all of other embodiments, obtained by a person ordinarily skilled in the art without paying inventive effort, should fall within the scope of protection of the present disclosure.

It should be noted that similar reference signs and letters represent similar items in the following accompanying drawings, therefore, once a certain item is defined in one accompanying drawing, it does not need to be further defined or explained in subsequent accompanying drawings.

In the description of the present disclosure, it also should be indicated that unless otherwise specified and defined explicitly, the terms "connect" and "couple" should be construed in a broad sense. For example, it may be fixed connection, detachable connection, or integral connection; it may be mechanical connection, and also may be electrical connection; it may be direct connection, indirect connection via an intermediate medium, or inner communication between two elements. For a person ordinarily skilled in the art, specific meanings of the above-mentioned terms in the present disclosure can be understood according to specific circumstances.

Figure 1:
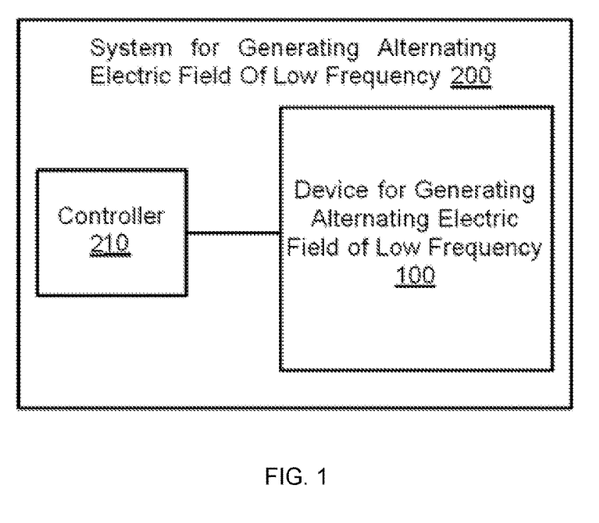
FIG. 1 illustrates a structural block diagram of a system for generating alternating electric field of low frequency provided in an embodiment of the present disclosure.

Referring to FIG. 1, an embodiment of the present disclosure provides a system for generating alternating electric field of low frequency 200. The system for generating alternating electric field of low frequency 200 comprises: a controller 210 and a device for generating alternating electric field of low frequency 100.

The controller 210 may be an integrated circuit chip, which has a signal processing capability, wherein the controller 210 may be a general-purpose processor, including a Central Processing Unit (CPU for short), a Network Processor ("NP" for short), etc., and also may be a digital signal processor (DSP), an application-specific integrated circuit (ASIC), a Field Programmable Gate Array (FPGA) or other programmable logic components, a discrete gate or a transistor logic component, or a discrete hardware assembly. Various methods, steps, and logic blocks disclosed in the embodiments of the present disclosure can be implemented or executed. The general-purpose processor may be a microprocessor or the processor may be any conventional processor and so on.

The controller 210 per se may have certain data storage capability, so as to store operation data required when the system for generating alternating electric field of low frequency 200 preserves various types of preserved biomass. In addition, the controller 210 may be provided with an input unit such as a knob, a button, or a touch screen. The controller 210 may be coupled with the device for generating alternating electric field of low frequency via a data bus, for example, via a 232bus, a 485 bus, or a Controller Area Network (CAN), etc. In the present embodiment, according to the type of biomass to be preserved, an operator inputs an operation instruction corresponding to the type of the preserved biomass by manipulating the input unit such as the knob, the button or the touch screen on the controller 210, wherein the preserved biomass may include: food, agricultural products, bio-derived materials, and so on. The controller 210 can select operation data corresponding to the operation instruction according to the operation instruction. Then the controller 210 generates a corresponding control instruction according to the operation data, and outputs the control instruction to the device for generating alternating electric field of low frequency 100 via the data bus, so as to control the operation of the device for generating alternating electric field of low frequency 100 by the control instruction.

The device for generating alternating electric field of low frequency 100 can acquire an alternating signal input from an external AC power supply by being coupled with the external AC power supply, wherein the external AC power supply may be an AC power supply of 220V. The alternating signal input from the external AC power supply is further rectified, inverted and boosted (bucked) to generate an alternating electric field of low frequency. The device for generating alternating electric field of low frequency 100 is also coupled with the controller 210 via a data bus and receives a control instruction input from the controller 210. The device for generating alternating electric field of low frequency 100 can adjust the current and frequency of the alternating signal according to the control instruction, so as to generate an alternating electric field of low frequency corresponding to the type of the preserved biomass, so that best preservation effects can be achieved for different types of preserved biomass in the device for generating alternating electric field of low frequency 100.

Figure 2:
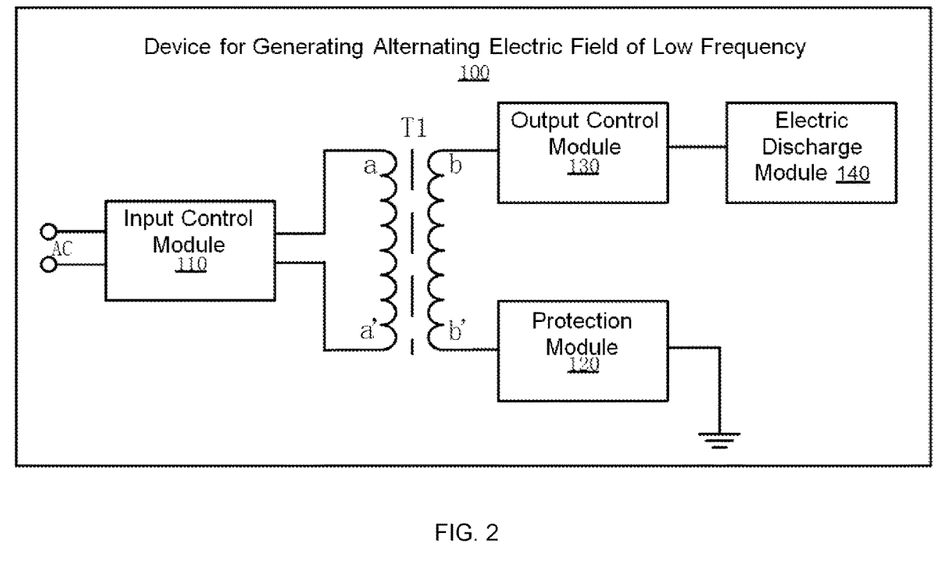
FIG. 2 illustrates a first structural block diagram of a device for generating alternating electric field of low frequency provided in an embodiment of the present disclosure.

Referring to FIG. 2, an embodiment of the present disclosure provides a device for generating alternating electric field of low frequency 100. The device for generating alternating electric field of low frequency 100 comprises: an input control module 110, a transformer T1, a protection module 120, an output control module 130 and an electric discharge module 140.

The input control module 110 is configured to acquire an alternating signal input from an external AC power supply, and generate a first low frequency signal according to the type of preserved biomass and the alternating signal, and output the first low frequency signal to a primary side winding aa' of the transformer T1. In the present embodiment, the operator may input, by an input unit such as a knob, a button or a touch screen on the input control module 110 itself, a control instruction corresponding to the type of the preserved biomass, such that the input control module 110 generates the first low frequency signal according to the control instruction and the alternating signal.

The transformer T1 is configured to boost (buck) the first low frequency signal input to the primary side winding aa' and then output the boosted (bucked) first low frequency signal from the secondary side winding bb' thereof to the output control module 130, by means of the electromagnetic coupling relation between the primary side winding aa' and the secondary side winding bb'.

The protection module 120 is configured to ensure normal operation of the device for generating alternating electric field of low frequency 100 by grounding, and forms overcurrent or overvoltage protection for the device for generating alternating electric field of low frequency 100, wherein the protection module 120 may be a protection resistor or a protection capacitor.

The output control module 130 is configured to acquire the second low frequency signal output from the secondary side winding bb' of the transformer T1, and adjust the current value of the second low frequency signal according to the type of the preserved biomass, so as to output the adjusted second low frequency signal to the electric discharge module 140. In the present embodiment, the operator may also input, by an input unit such as a knob, a button, or a touch screen on the output control module 130 itself, a control instruction corresponding to the type of the preserved biomass, such that the input control module 110 adjusts the current value of the second low frequency signal according to the control instruction.

The electric discharge module 140 is configured to generate an alternating electric field of low frequency according to the received second low frequency signal.

Figure 3:
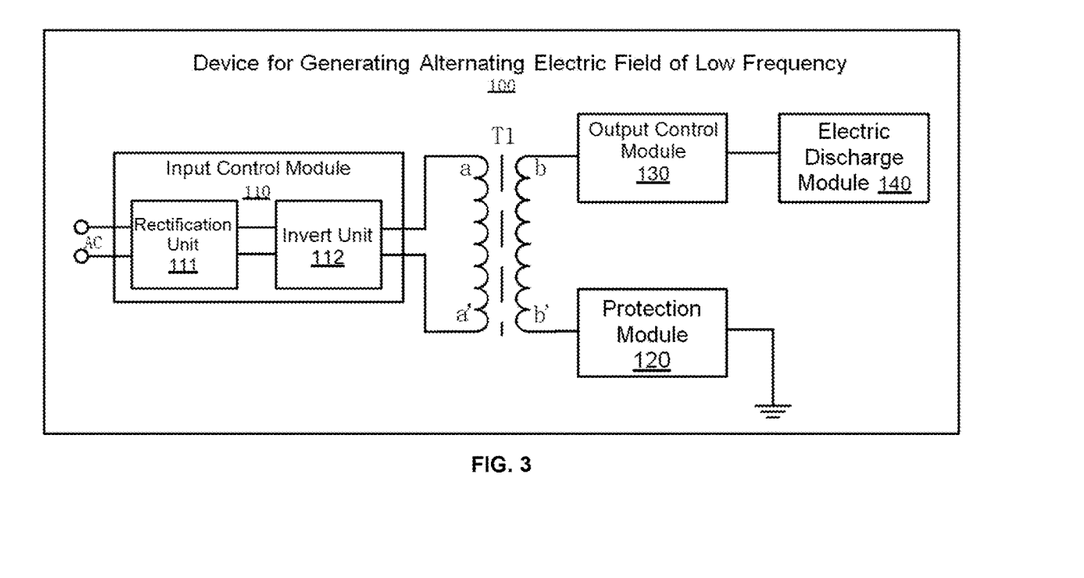
FIG. 3 illustrates a second structural block diagram of a device for generating alternating electric field of low frequency provided in an embodiment of the present disclosure.

Referring to FIG. 3, the input control module 110 comprises: a rectification unit 111 and an invert unit 112.

The rectification unit 111 is configured to rectify the alternating signal input from the external AC power supply, and output the rectified alternating signal to the invert unit 112. Specifically, the rectification unit 111 may be a half-wave rectification circuit or a full-wave rectification circuit, wherein the full-wave rectification circuit may be a bridge type rectification circuit composed of multiple diodes. It is to be understood that the type of the rectification circuit in the rectification unit 111 may be determined according to the actual implementation, which is not limited herein. The rectification unit 111 is coupled with the external AC power supply via a power line so as to acquire an AC alternating signal input from the external AC power supply. The rectification unit 111 rectifies the AC alternating signal into a DC alternating signal or filters out pulsating alternating signals of some waveforms, according to the rectification circuit thereof. The rectification unit 111 is also coupled with the invert unit 112 via a power line so as to output the rectified alternating signal to the invert unit 112.

The invert unit 112 is configured to acquire the alternating signal output from the rectification unit 111, and outputs the first low frequency signal, generated according to the alternating signal and the type of the preserved biomass, to the primary side winding aa' of the transformer T1. Specifically, the invert unit 112 may comprise: a bridge invert circuit, a control logic circuit, and a filter circuit. The bridge invert circuit can be coupled with the rectification unit 111 and the filter circuit respectively via a power line, the control logic circuit controls the bridge invert circuit by means of being coupled with the bridge invert circuit via a power line, and the filter circuit is coupled with the primary side winding aa' of the transformer T1 via a power line. In addition, the invert unit 112 may further be provided with an input unit such as a knob, a button, or a touch screen. The invert unit 112 is coupled with the rectification unit 111 via a power line, and therefore can acquire the alternating signal input from the rectification unit 111, so as to invert the alternating signal into an AC first low frequency signal by the bridge invert circuit thereof. In the present embodiment, the operator may input a control instruction corresponding to the type of the preserved biomass to the control logic circuit by manipulating the input unit such as a knob, a button, or a touch screen on the invert unit 112. Besides, the control logic circuit may also receive the control instruction input by the controller by means of being coupled with the controller. It should be noted that the mode in which the control logic circuit acquires the control instruction may also be determined according to the actual implementation, which is not limited herein. The control logic circuit can correspondingly control the bridge invert circuit according to the control instruction acquired. By the control of the control logic circuit over the bridge invert circuit, the waveform of the first low frequency signal generated from the inversion by the bridge invert circuit includes: a sine wave, a cosine wave, a square wave, a rectangular wave, a trapezoidal wave, or a sawtooth wave, etc., and the first low frequency signal has a frequency ranging from 1 HZ to 300 kHZ. The invert unit 112 further filters the first low frequency signal by the filter circuit thereof, so as to remove an interference signal from the first low frequency signal, and then outputs, by being coupled with the primary side winding aa' of the transformer T1 via a power line, the first low frequency signal to the primary side winding aa' of the transformer T1.

The primary side winding aa' of the transformer T1 is coupled with the invert unit 112 via a power line, such that the primary side winding aa' thereof can acquire the first low frequency signal. By means of the electromagnetic coupling relation between the primary side winding aa' and the secondary side winding bb' of the transformer T1, the transformer T1 can boost (buck), by the secondary side winding bb' thereof, the first low frequency signal input to the primary side winding aa' and then generate the second low frequency signal. In an embodiment, the second low frequency signal is generated after boosting of the secondary side winding bb'. In another embodiment, the transformer T1 is an adjustable transformer T1. The operator can adjust the transformer ratio of the transformer T1 by adjusting the number of coupling turns between the primary side winding aa' and the secondary side winding bb' of the transformer T1, and further can adjust the voltage amplitude of the second low frequency signal, wherein the voltage of the second low frequency signal ranges from 500V to 5000V. In the present embodiment, by adjusting the transformer ratio of the transformer T1, the operator may also enable the voltage of the second low frequency signal generated by the transformer T1 to be adapted to the type of the biomass to be preserved. In addition, because of the insulation material wrapped onto the primary side winding aa' and the secondary side winding bb' of the transformer T1, an electrical isolation of 10KV can be maintained between the primary side winding aa' and the secondary side winding bb' of the transformer T1, which improves the operation reliability and security of the device for generating alternating electric field of low frequency 100. One end of the secondary side winding bb' of the transformer T1 is coupled with the protection module 120, and the other end of the secondary side winding bb' thereof is coupled with the output control module 130 via a power line.

One end of the protection module 120 is coupled with one end of the secondary side winding bb' of the transformer T1 via a power line, and the other end of the protection module 120 is grounded. The grounding of the other end of the protection module 120 can ensure that the circuit forms a closed loop so as to ensure that the device for generating alternating electric field of low frequency 100 can generate an alternating electric field of low frequency. In the above, the other end of the protection module 120 being grounded may be that the protection module 120 is coupled with a grounded end to form a closed loop, and the other end of the protection module 120 being grounded may also be that the protection module 120 is coupled with a ground wire to form a closed loop. The mode of being grounded may be selected according to the environmental requirements of the actual application, which is not specifically limited herein. In the present embodiment, the protection module 120 may comprise: a protection resistor or protection capacitor, and the resistance value of the resistor thereof or the capacitance of the capacitor thereof may be determined according to actual implementation. If overcurrent or overvoltage occurs to the device for generating alternating electric field of low frequency 100, the protection module 120 can effectively share and bear the output power of the device for generating alternating electric field of low frequency 100 at this time, so as to avoid damage to other modules.

The output control module 130 can effectively control and adjust the output power which is output to the electric discharge module 140. Specifically, the output control module 130 also can be coupled with the other end of the secondary side winding bb' of the transformer T1 via a power line, so as to acquire the second low frequency signal output by the secondary side winding bb' of the transformer T1. The output control module 130 further may be provided with an input unit such as a knob, a button, or a touch screen. In the present embodiment, the operator may input the control instruction corresponding to the type of the preserved biomass to the output control module 130 by manipulating the knob, the button, or the touch screen on the output control module 130. Besides, the output control module 130 also may receive the control instruction input by the controller. It should be noted that the mode of acquiring the control instruction by the output control module 130 may also be determined according to actual implementation, which is not limited herein. After the output control module 130 acquires the control instruction, the output control module 130 can correspondingly adjust the magnitude of the current of the acquired second low frequency signal according to the control instruction, and further adjust the output power which is output to the electric discharge module 140. In an embodiment, the adjustment by the output control module 130 to the current of the second low frequency signal ranges from 0.0001 A to 0.15 A. The output control module 130 is further coupled with the electric discharge module 140 via a power line, so as to output the second low frequency signal to the electric discharge module 140.

The electric discharge module 140 is coupled with the output control module 130 via a power line, so as to generate an alternating electric field of low frequency according to the received second low frequency signal. Specifically, the electric discharge module 140 may be an electrode plate. In order to ensure use security, the outer surface of the electric discharge module 140 is fully covered by an insulation material. After acquiring the second low frequency signal, the electric discharge module 140, due to its own electric discharging function, can induce an alternated alternating electric field of low frequency within an environment space of operation in a continuous and stable manner according to the second low frequency signal. In addition, the electric discharge module 140 may be in shape of a plate, a strip, a column or a net, etc., and the specific shape thereof may be dependent on the actual environment of application site thereof, and is not limited herein. Furthermore, according to the actual application environment, there may be multiple electric discharge modules 140, and each of the electric discharge modules 140 is coupled with the output control module 130 via a power line, such that the multiple electric discharge modules 140 are in parallel connection. After the multiple electric discharge modules 140 are connected in parallel, the preservation effect of the device for generating alternating electric field of low frequency 100 on the preserved biomass can be effectively improved. Besides, the electric discharge module 140 is relatively distant from the grounded end in the device for generating alternating electric field of low frequency 100, such that attenuation of the electric field thereof is weak within a short distance, which can further render good preservation effects on all the preserved biomasses placed in different positions in the alternating electric field of low frequency. Furthermore, since the output control module 130 adjusts current intensity of the second low frequency signal, the intensity of the voltage across the discharge plates that is output by the electric discharge module 140 may be 500 volts to 5000 volts.

Figure 4:
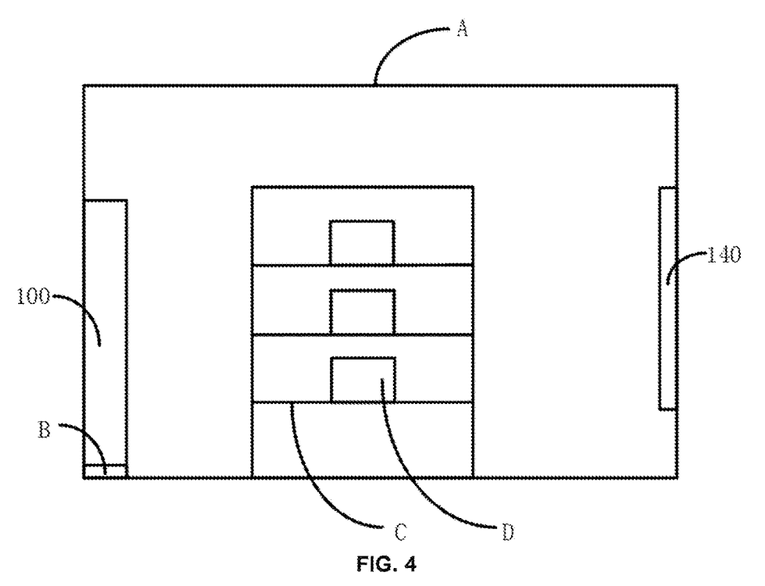
FIG. 4 illustrates a schematic diagram of a first application environment of the device for generating alternating electric field of low frequency provided in an embodiment of the present disclosure.
Figure 5:
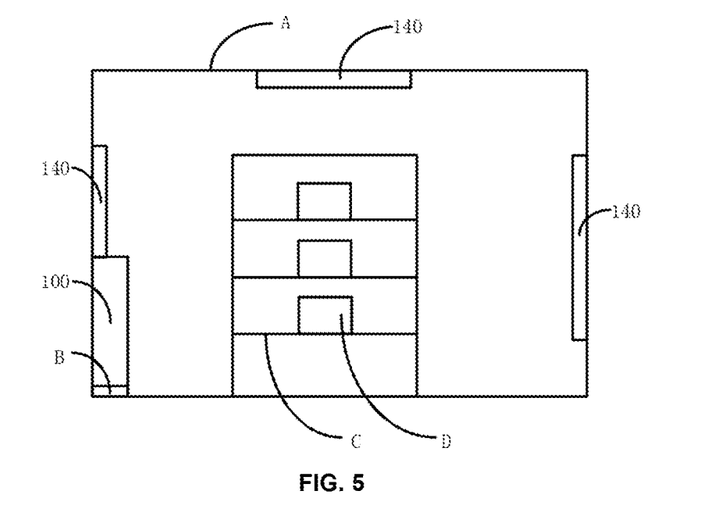
FIG. 5 illustrates a schematic diagram of a second application environment of the device for generating alternating electric field of low frequency provided in an embodiment of the present disclosure.

Referring to FIG. 4 and FIG. 5, FIG. 4 and FIG. 5 both show practical application of the device for generating alternating electric field of low frequency 100. A in FIG. 4 and FIG. 5 is a cabinet in which a device for generating alternating electric field of low frequency 100 is installed, which may be a refrigerating preservation chamber, a refrigerator vehicle, a semi-finished products warehouse of a food processing plant, a refrigerator, a freezer or a fresh food display cabinet of a shopping mall. B in the figures is the grounded end of the device for generating alternating electric field of low frequency 100. C in FIG. 4 and FIG. 5 is a shelf C placed in the cabinet A, and D in FIG. 4 and FIG. 5 is the preserved article placed on the shelf C. Depending upon the difference of actual installation and use environment, the electric discharge module 140 in FIG. 4 has one electrode, while the electric discharge module 140 in FIG. 5 has multiple electrodes. In the present embodiment, if the device for generating alternating electric field of low frequency 100 is installed in a refrigerating preservation chamber, a refrigerator vehicle or a semi-finished products warehouse of a food processing plant, it is possible to realize preservation of multiple kinds of food or semi-finished food products. If the device for generating alternating electric field of low frequency 100 is installed in a refrigerator or a freezer, it is possible to prolong the shelf life of perishable leafy vegetables and fruits such as Chinese cabbage, lettuce, scallion, garlic, coriander, strawberry or cherry stored in the refrigerator or the refrigerating preservation cabinet to 5-7 days or longer, and can further ensure that color, moisture, hardness, etc. of the vegetables are good and are slightly different from fresh vegetables and fruits. If the device for generating alternating electric field of low frequency 100 is installed in a fresh food display cabinet of a shopping mall, it is possible to prolong the freshness retention time of the fresh products such as fresh meat or fish and shrimp and other aquatic products in the display cabinet by 2 times or more, and can also suppress microbial reproduction in the fresh products and generation of undesirable odors in the display cabinet.

Experimental data of the device for generating alternating electric field of low frequency 100 provided in the present embodiment is as follows:

Strawberries usually have a shelf life of 2 days when perseverved by conventional storage means at normal temperature (20-25° C.), but when strawberries are placed in an alternating electric field of low frequency generated by the device for generating alternating electric field of low frequency 100 and the electric potential at the position where the strawberries are placed is 50V, the shelf life of the strawberries at normal temperature can be prolonged by 5-7 days. If strawberries are preserved at conventional low temperatures (0-4° C.), the shelf life thereof is only 3-4 days. However, if strawberries are placed in an alternating electric field of low frequency at the low temperature environment of 0-4° C. and the electric potential at the position where the strawberries are placed in the device for generating alternating electric field of low frequency 100 is 50V, the shelf life of the strawberries is prolonged to about 2 weeks. Moreover, the good fruit rate of the strawberries may be kept at 96% or above.

Coriander has a shelf life of about 2 days when persevered by conventional storage means at a low temperature below 10° C., but when coriander is placed in a alternating electric field of low frequency generated by the device for generating alternating electric field of low frequency 100 at an environment temperature of 0-10° C. and the electric potential at the position where the coriander is placed is 50V, the shelf life of the coriander is prolonged to about 7 days. Moreover, in the device for generating alternating electric field of low frequency 100, the coriander within the shelf life has a color of light green, is saturated with moisture and has no decay or yellow leaves.

Pork merely has a shelf life of 2-4 days when persevered by a conventional storage means at a temperature of 0-4° C. But when pork is placed in a alternating electric field of low frequency generated by the device for generating alternating electric field of low frequency 100 at an environment temperature of 0-4° C. and the electric potential at the position where the pork is placed is 150V, the shelf life of the pork may be up to 12-15 days. Moreover, in the device for generating alternating electric field of low frequency 100, the pork within the shelf life has a fresh and unsticky appearance, has no undesirable odor and maintains distinct original colors of red and white.

When preserved by a conventional storage means, tilapia, after being caught, should be stored at 0° C. with the presence of ice and has a shelf life of no more than 48 hours, otherwise, it will spoil to be non-edible. But when it is placed in a alternating electric field of low frequency generated by the device for generating alternating electric field of low frequency 100 with an environment temperature of 0-4° C. and the electric potential at the position where the tilapia is placed is 200V, its shelf life may be up to 7-10 days. Moreover, in the device for generating alternating electric field of low frequency 100, the tilapia within the shelf life has a bright and shining appearance and has no undesirable odor, and the total number of microorganism colonies is not changed significantly, but remains within a range of $2.4 \times 10^2$ to $7.8 \times 10^3$.

Figure 6:
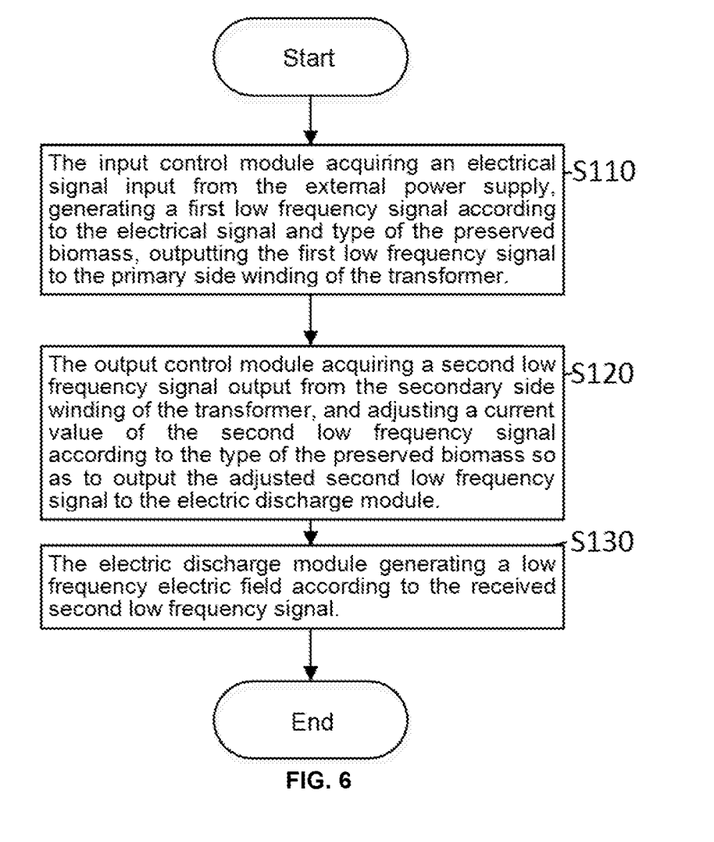
FIG. 6 illustrates a flow chart of a signal regulating method provided in an embodiment of the present disclosure.

Referring to FIG. 6, an embodiment of the present disclosure further provides a signal regulating method, applicable to the device for generating alternating electric field of low frequency. The signal regulating method comprises: step S110, step S120 and step S130.

Step S110: the input control module acquiring an alternating signal input from the external AC power supply, generating a first low frequency signal according to the alternating signal and the type of preserved biomass, and outputting the first low frequency signal to the primary side winding of the transformer.

Step S120: the output control module acquiring a second low frequency signal output from the secondary side winding of the transformer, and adjusting a current value of the second low frequency signal according to the type of the preserved biomass so as to output the adjusted second low frequency signal to the electric discharge module.

Step S130: the electric discharge module generating an alternating electric field of low frequency according to the received second low frequency signal.

Figure 7:
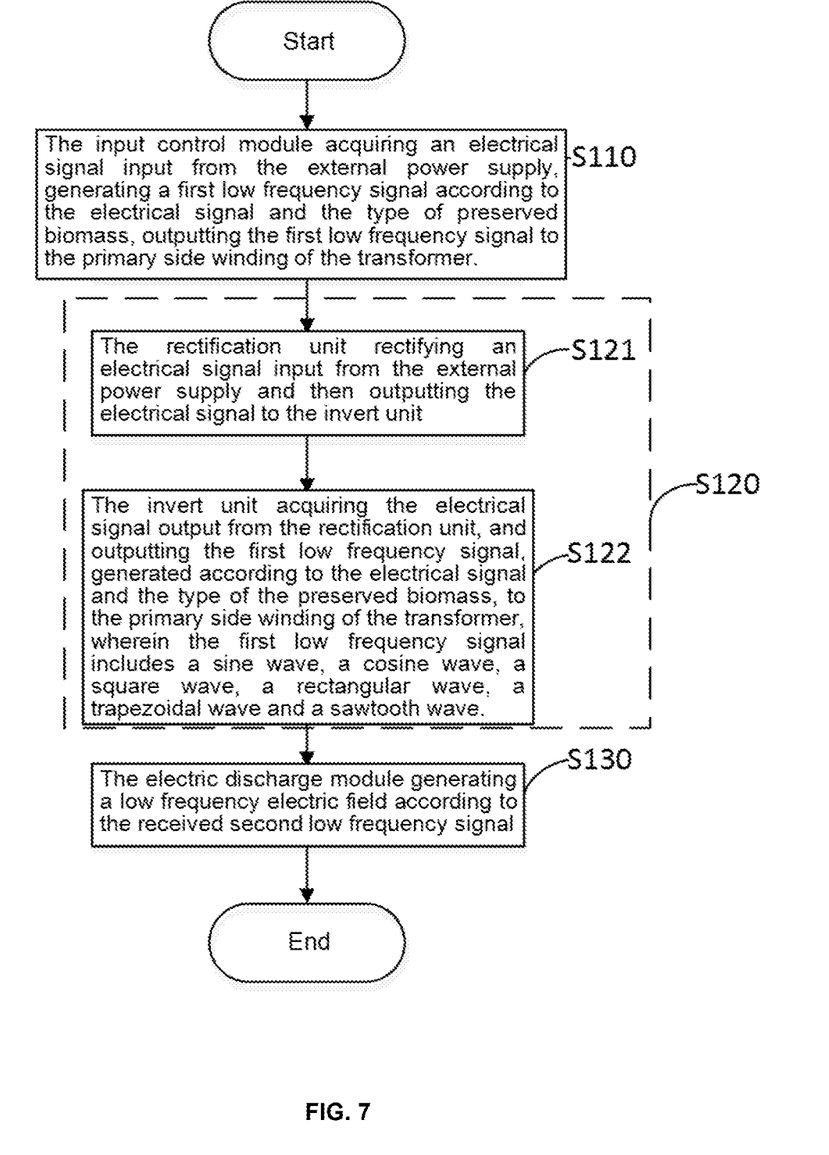
FIG. 7 illustrates a sub-flow chart of step S120 in the signal regulating method provided in an embodiment of the present disclosure.

Referring to FIG. 7, the sub-flow of step S120 in the signal regulating method further comprises: step S121 and step S122.

Step S121: the rectification unit rectifying an alternating signal input from the external AC power supply and then outputting the alternating signal to the invert unit.

Step S122: the invert unit acquiring the alternating signal output from the rectification unit, and outputting the first low frequency signal, generated according to the alternating signal and the type of the preserved biomass, to the primary side winding of the transformer, wherein the first low frequency signal includes a sine wave, a cosine wave, a square wave, a rectangular wave, a trapezoidal wave or a sawtooth wave.

A person skilled in the art can clearly know that for the sake of descriptive convenience and conciseness, reference can be made to corresponding processes in the preceding device for specific operation processes of the method described in the above, and they will not be repeated redundantly herein.

To sum up, the embodiments of the present disclosure provide a device for generating alternating electric field of low frequency 100, a signal regulating method and a system for generating alternating electric field of low frequency 200. The device for generating alternating electric field of low frequency 100 comprises: an input control module 110, a transformer T1, an output control module 130 and an electric discharge module 140. An input end of the input control module 110 is configured to be coupled with an external AC power supply, the input control module 110 is coupled with a primary side winding aa' of the transformer T1, one end of a secondary side winding bb' of the transformer T1 is coupled with the output control module 130, the output control module 130 is coupled with the electric discharge module 140, and the other end of the secondary side winding bb' of the transformer T1 is coupled with ground potential.

It is possible to acquire an alternating signal input from the external AC power supply by the input control module 110, generate a first low frequency signal corresponding to the type of preserved biomass according to the acquired alternating signal and the type of the preserved biomass, and output the first low frequency signal to a primary side winding aa' of the transformer T1. The transformer T1 outputs a second low frequency signal by a secondary side winding bb' according to the first low frequency signal of the primary side winding aa' by means of the electromagnetic coupling relation between the primary side winding aa' and the secondary side winding bb' of the transformer T1. The output control module 130 can acquire the second low frequency signal output by the secondary side winding bb' of the transformer T1, and adjust the current value of the second low frequency signal according to the type of the preserved biomass so as to output the adjusted second low frequency signal which corresponds to the type of the preserved biomass to the electric discharge module 140. The electric discharge module 140 can discharge electricity to generate an alternating electric field of low frequency by the received second low frequency signal. When the preserved biomass is placed in the alternating electric field of low frequency, the alternating electric field of low frequency can make the water molecules in the preserved biomass to swing at the same frequency, thereby effectively suppressing the biochemical reactions and physiological metabolism in the preserved biomass, therefore making it possible to achieve excellent preservation function on the preserved biomass. In addition, since the characteristics of the alternating electric field of low frequency can correspond to the type of the biomass to be preserved, the alternating electric field of low frequency can exert excellent preservation effect on the preserved biomass.

The above-mentioned are merely preferred embodiments of the present disclosure, which are not used for limiting the present disclosure. For one skilled in the art, various modifications and changes may be made to the present disclosure. Any amendments, equivalent replacements, improvements, and so on, within the spirit and principle of the present disclosure, should be covered within the scope of protection of the present disclosure.

The invention claimed is:

1. A device for generating an alternating electric field of low frequency, wherein the device comprises:
    an input control module, a transformer, an output control module and an electric discharge module, an input end of the input control module is configured to be coupled with an external AC power supply, the input control module is coupled with a primary side winding of the transformer, one end of a secondary side winding of the transformer is coupled with the output control module, the output control module is coupled with the electric discharge module, and the other end of the secondary side winding of the transformer is coupled with ground potential;
    the input control module is configured to acquire an alternating signal input from the external AC power supply, generate a first low frequency signal according to the alternating signal and the type of preserved biomass, and output the first low frequency signal to the primary side winding of the transformer;
    the output control module is configured to acquire a second low frequency signal output from the secondary side winding of the transformer, and adjust a current value of the second low frequency signal according to the type of the preserved biomass so as to output the adjusted second low frequency signal to the electric discharge module; and
    the electric discharge module is configured to generate the alternating electric field of low frequency according to the received second low frequency signal;
    wherein the input control module comprises a rectification unit and an invert unit, the rectification unit being coupled with the external AC power supply, the rectification unit being further coupled with an input end of the invert unit, and the invert unit being coupled with the primary side winding of the transformer;
    wherein the rectification unit is configured to rectify the alternating signal input from the external AC power supply and then output the alternating signal to the invert unit; and
        wherein the invert unit is configured to acquire the alternating signal output from the rectification unit, and output the first low frequency signal to the primary side winding of the transformer, with the first low frequency signal generated according to the alternating signal and the type of the preserved biomass, wherein the first low frequency signal includes a sine wave, a cosine wave, a square wave, a rectangular wave, a trapezoidal wave and/or a sawtooth wave.

2. The device of claim 1, further comprising a protection module which is coupled with the ground potential and the other end of the secondary side winding of the transformer.

3. The device of claim 1, wherein the alternating electric field of low frequency has a voltage intensity of 500 volts to 5000 volts on an electrode of the electric discharge module.

4. The device of claim 3, wherein the electric discharge module is made of electrically conductive material, and the electric discharge module is in shape of a plate, a strip, a column or a net.

5. The device of claim 3, wherein an outer surface of the electric discharge module is covered by an insulation material.

6. The device of claim 1, wherein the second low frequency signal has a current intensity of 0.0001 amps to 0.15 amps.

7. A signal regulating method, which uses the device of claim 1, the method comprising:
    acquiring, by the input control module, the alternating signal input from the external AC power supply, generating a first low frequency signal according to the alternating signal and the type of preserved biomass, and outputting the first low frequency signal to the primary side winding of the transformer;
    acquiring, by the output control module, the second low frequency signal output from the secondary side winding of the transformer, and adjusting a current value of the second low frequency signal according to the type of the preserved biomass so as to output the adjusted second low frequency signal to the electric discharge module; and
    generating, by the electric discharge module, an alternating electric field of low frequency according to the received second low frequency signal.

8. A system for generating an alternating electric field of low frequency, wherein the system comprises a controller and the device of claim 1, and the controller is coupled with the device for generating the alternating electric field of low frequency.

9. The system of claim 8, wherein the device further comprises a protection module which is coupled with the ground potential and the other end of the secondary side winding of the transformer.

10. The system of claim 9, wherein the alternating electric field of low frequency has a voltage intensity of 500 volts to 5000 volts on an electrode of the electric discharge module.

11. The system of claim 9, wherein the second low frequency signal has a current intensity of 0.0001 amps to 0.15 amps.

12. The system of claim 8, wherein the alternating electric field of low frequency has a voltage intensity of 500 volts to 5000 volts on an electrode of the electric discharge module.

13. The system of claim 12, wherein the electric discharge module is made of electrically conductive material and the electric discharge module is in shape of a plate, a strip, a column or a net.

14. The system of claim 12, wherein an outer surface of the electric discharge module is covered by an insulation material.

15. The system of claim 8, wherein the second low frequency signal has a current intensity of 0.0001 amps to 0.15 amps.

16. The system of claim 15, wherein the device further comprises a protection module which is coupled with the ground potential and the other end of the secondary side winding of the transformer.

17. The system of claim 16, wherein the alternating electric field of low frequency has a voltage intensity of 500 volts to 5000 volts on an electrode of the electric discharge module.

18. The system of claim 15, wherein the alternating electric field of low frequency has a voltage intensity of 500 volts to 5000 volts on an electrode of the electric discharge module.

19. The system of claim 8, wherein the electric discharge module is made of electrically conductive material and the electric discharge module is in shape of a plate, a strip, a column or a net.

20. The system of claim 8, wherein an outer surface of the electric discharge module is covered by an insulation material.

\* \* \* \* \*